United States Patent Office 3,438,936
Patented Apr. 15, 1969

3,438,936
MODIFIED CYCLOTETRASILOXANE POLYMERS
Harry F. Lamoreaux, Schenectady, N.Y., assignor to
General Electric Company, a corporation of New
York
No Drawing. Filed Oct. 6, 1967, Ser. No. 673,268
Int. Cl. C08g 31/09, 47/02, 51/04
U.S. Cl. 260—46.5                                10 Claims

ABSTRACT OF THE DISCLOSURE

A cyclotetrasiloxane polymer contains a plurality of cyclotetrasiloxane rings joined together through divalent modifier radicals attached to the silicon atoms of the cyclotetrasiloxane rings. The modifier radicals are described by the formulas:

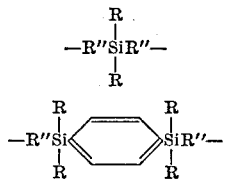

and

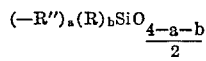

where R is a substituted or unsubstituted monovalent hydrocarbon radical, R'' is a divalent alkylene radical, $a$ has a value of 0.5 to 1 and $b$ has a value of 2. An organopolysiloxane polymer within the scope of the present invention is made by reacting two moles of:

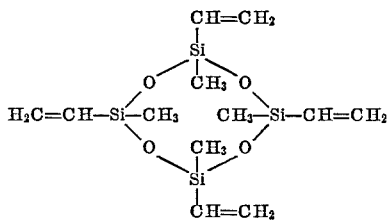

with one mole of:

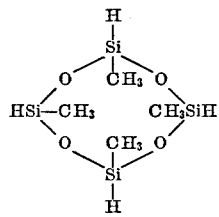

and two moles of:

Polymers within the scope of the present invention are useful as potting compounds.

This invention relates to tough, thermally stable, optically clear, solvent resistant organopolysiloxane polymers which have improved resistance to thermal shock, an improved flexural strength and an improved modulus of elasticity. It also relates to opaque filled polymers.

Optically clear, organic polymers have obtained wide spread use in the art. These optically clear, synthetic materials have been used for potting electrical and electronic components when it has been desirable to insulate and/or to protect the components while at the same time being able to view the circuit. The advantage of being able to view the circuit is that a single component can be visually located, removed and replaced from a circuit without the loss of the entire circuit.

Transparent organic polymers are also used as substitutes in optical systems, since they can be cast into the desired lens shape without the necessity for the complicated polishing operations which are necessary for conventional glass lens elements. Organic polymer optical elements have been used in equipment such as telescopes, and the like, and have also been used in the formation of contact lenses for correcting human vision.

While prior art optically clear polymeric organic materials have had many advantages and uses as outlined above, they have also had many disadvantages. Thus, these materials have rarely had any degree of thermal stability, have had poor resistance to organic solvents as well as acids and alkalis, and have not had the desired abrasion resistance or the high electrical strength which is often desired.

U.S. Patents 3,197,432 and 3,197,433 to Lamoreaux disclose polymers made by reacting a cyclotetrasiloxane containing two or four silanic hydrogen groups with a cyclotetrasiloxane containing two or four olefinic groups, at least one of the reactants being tetrafunctional. While the cyclotetrasiloxane polymers described in the above-mentioned Lamoreaux patents are superior in many ways in the optically clear organic resins of the prior art, they do lack certain properties that are necessary for some applications. One of the properties which the prior art cyclotetrasiloxane polymers lack is resistance to thermal shock. Wide, fast temperature changes caused by the heating up and cooling down of the electronic components embedded in the prior art cyclotetrasiloxane polymers have often caused the polymers in contact with the electronic components to craze, thus destroying the optical and electrical properties of the polymer.

The object of the present invention is to provide optically clear, tough, solid, thermally stable, solvent resistant, high dielectric strength, abrasion resistant, modified cyclotetrasiloxane polymers which are strong and flexible enough to withstand thermal shock without crazing. Thus, the modified cyclotetrasiloxane polymers of the present invention find application in all of the uses mentioned above for organic polymers and cyclotetrasiloxane polymers and are superior in many applications, such as potting compounds in circuits where high thermal stress is present.

In addition, the prior art cyclotetrasiloxane polymers are brittle. The modified cyclotetrasiloxane polymers of the present invention overcome this problem by providing both the strength and flexibility lacking in the prior art cyclotetrasiloxane polymers while retaining the desirable properties. The polymers of the present invention are also useful in making high strength, abrasion resistant false teeth, which may be cast in one piece with the denture plate, windows for fluidized bed chemical reactors, aircraft windshields, safer auto windshields, television tubes, light bulbs which may be cast into ornamental shapes, outdoor flood lamps which are resistant to the thermal shock caused by rain drops, fibers and other uses where an abrasion resistant glass substitute is needed.

The modified cyclotetrasiloxane polymers of the present invention also have utility as a molding resin. The molding resin is made by first polymerizing the components to a solid, benzene insoluble, incompletely cured mass which is milled to a dry powder. This dry powder is then press-cured to give a glass-like substance.

This, and other objects of my invention, are accomplished by providing a modified cyclotetrasiloxane polymer containing a plurality of 8-membered rings of alternate silicon atoms and oxygen atoms. Each of said silicon atoms is attached to one monovalent hydrocarbon radical free of aliphatic unsaturation. At least 14% of the silicon atoms of the 8-membered rings are attached to another silicon atom of the 8-membered rings through a modifier radical such as:

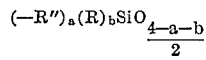

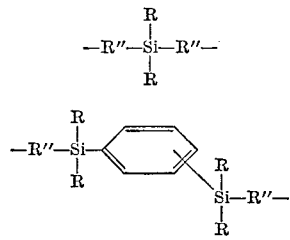

and

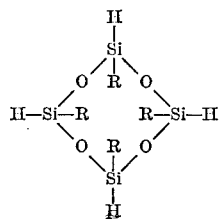

The remaining silicon atoms of the 8-membered rings are joined through alkylene radicals. In the above formulas, R is a monovalent organic radical free of aliphatic unsaturation, R'' is an alkylene radical, $a$ has a value of 0.5 to 1, and $b$ has a value of 2.

The optically clear organopolysiloxanes of the present invention are prepared by contacting (1) a first cyclotetrasiloxane in which each silicon atom is attached to both one monovalent hydrocarbon radical free of aliphatic unsaturation and to one hydrogen atom with (2) a second cyclotetrasiloxane in which each silicon atom is attached to both one monovalent hydrocarbon radical free of aliphatic unsaturation and to one monovalent hydrocarbon radical containing olefinc unsaturation and (3) a modifier containing two olefinic or silanic hydrogen radicals. A catalyst is then added to promote the addition of the silanic hydrogen containing first cyclotetrasiloxane to the olefinically unsaturated second cyclotetrasiloxane and the addition of the olefinic or silanic-hydrogen containing modifier forming silane or siloxane to the corresponding olefinic or silanic hydrogen-substituted cyclotetrasiloxane.

The cyclotetrasiloxanes employed in the practice of the present invention in which each silicon atom is attached to both a hydrocarbon radical and a hydrogen atom are well known in the art and can be described by the formula:

(1)

where R represents a monovalent hydrocarbon radical free of aliphatic unsaturation. Each of the four R groups in the cyclotetrasiloxane of Formula 1 can represent the same group or the several R groups can be different. Among the R groups within the scope of Formula 1 can be mentioned, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals e.g., benzyl, phenylethyl, etc. radicals; cycloalkyl radicals, e.g., cyclohexyl, cycloheptyl, etc. radicals; halogenated derivatives of the above radicals, including chloromethyl, chloropropyl, trifluoromethyl, chlorophenyl, dibromophenyl, tetrachlorophenyl, difluorophenyl, etc. radicals; and cyanoalkyl radicals, e.g., beta-cyanoethyl, gamma-cyanopropyl, beta-cyanopropyl, etc. radicals. Preferably, the R radicals are methyl or phenyl radicals or a mixture of methyl and phenyl radicals.

The cyclotetrasiloxanes within the scope of Formula 1 can be formed, for example, by the hydrolysis and condensation of organochlorosilanes such as methyldichlorosilane, phenyldichlorosilane, octyldichlorosilane cyclohexyldichlorosilane, and by the cohydrolysis and cocondensation of a mixture of two or more organochlorosilanes, such as by the cohydrolysis and cocondensation of a mixture of methyldichlorosilane and phenyldichlorosilane. The cyclotetrasiloxane of Formula 1 will be referred to hereinafter as "methyl hydrogen cyclotetrasiloxane" when R is a methyl radical.

The cyclotetrasiloxanes in which each silicon atom is attached to both a monovalent hydrocarbon radical and a radical containing olefinic unsaturation can be represented by the formula:

(2)

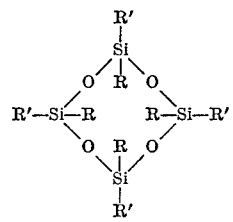

where R is as previously defined and R' is a monovalent hydrocarbon radical containing olefinic unsaturation. Illustrative of the R' radicals within the scope of Formula 2 are, for example, vinyl, allyl, 1-hexenyl, 3-octenyl, etc. radicals. Preferably, the alkenyl radical is vinyl. The tetramer of Formula 2 will be referred to hereinafter as "methylvinylcyclotetrasiloxane" when R' is a vinyl radical and R is a methyl radical.

The cyclotetrasiloxane within the scope of Formula 2 can be prepared by conventional means such as, for example, by the hydrolysis and condensation of an organoalkenyldichlorosilane, such as methylvinyldichlorosilane, phenylallyldichlorosilane, etc. In addition, within the scope of Formula 2 are cyclotetrasiloxanes in which the four R groups represent different groups. Thus, the R groups can represent, for example, both methyl and phenyl groups. Such a cyclotetrasiloxane can be prepared, for example by the cohydrolysis and cocondensation of a mixture of methylvinyldichlorosilane and phenylvinyldichlorosilane.

Modifier compounds containing olefinic or silanic-hydrogen represented by the formulas:

(3)          $(R)_2Si(H)_2$ (4)          $(R)_2Si(R')_2$ (5)

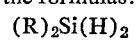

(6)

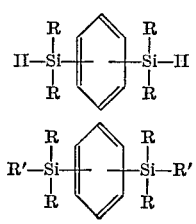

(7) 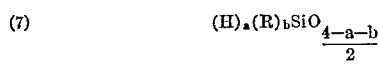

(8) 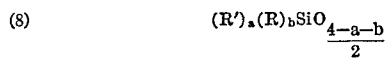

These modifier compounds, by reaction with the olefinic radicals of a cyclotetrasiloxane or the silanic hydrogen of a cyclotetrasiloxane, result in the cyclotetrasiloxane being joined to silane modifier radicals within the scope of the formulas:

(9) 

radicals derived from silphenylene within the scope of the formula:

(10) 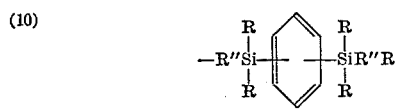

and siloxane modifier radicals within the scope of the formula:

(11) 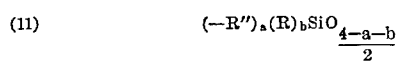

where R, R' are as previously defined, —R'' is a divalent alkylene radical bonded by a covalent bond to a silicon atom of a cyclotetrasiloxane, $a$ has a value of 0.5 to 1, and $b$ has a value of 2.

As can be seen from the modifier radical formulas, the vinyl radicals of the cyclotetrasiloxane, upon reacting, become part of the modifier radicals as defined.

When R is an alkyl radical in Formulas 3 through 8, inclusive, the modified tetramer polymers formed from such materials lack the extreme high temperature strength of the modified tetramer polymers made from the corresponding materials when R is an aryl radical. Low temperature strength and solvent resistance, however, are improved when R is an alkyl radical.

Among the modifier compounds which can be employed in the practice of the present invention are divinyldimethylsilane, diphenylsilane, diphenyldiallysilane, bis-dimethylsilylbenzene, 1,3-divinyl-1,1,3,3-tetramethyldisiloxane, 1,1,3,3 - tetramethyldisiloxane, 1,3 - dimethyl-1,3-diphenyldisiloxane, 1,1,3,3-tetraphenyldisiloxane, 1,1,3,3-tetra-m-tolyldisiloxane and 1,5-divinyl-1,1,3,3,5,5-hexamethyltrisiloxane.

The cyclotetrasiloxane of Formula 1 is reacted with the cyclotetrasiloxane of Formula 2 and a modifier compound selected from Formulas 3 through 8 inclusive, by contacting the two cyclotetrasiloxanes and the modifier compound in the presence of a catalyst for the addition of silicon-hydrogen bonds across olefinic double bonds.

While the precise reaction conditions will depend to a major extent on the particular catalyst employed, the reaction is generally effected by heating the two cyclotetrasiloxanes and a modifier compound to a temperature which can vary from about 30° C. up to the boiling point of the lower boiling of the two cyclotetrasiloxanes or the modifier compound. This upper temperature is generally of the order of about 100 to 125° C. The effect of the reaction is to add silicon-hydrogen linkages of the cyclotetrasiloxane of Formula 1 across olefinic double bonds of the R' groups of the cyclotetrasiloxane within the scope of Formula 2 while at the same time adding modifier radicals to either the silicon-hydrogen linkages of the cyclotetrasiloxane of Formula 1 or across the olefinic double bonds of the R' groups of the cyclotetrasiloxane within the scope of Formula 2. Thus, considering the beginning of the reaction, for example, one molecule of a cyclotetrasiloxane within the scope of Formula 1 reacts with 3 molecules of a cyclotetrasiloxane within the scope of Formula 2 which, for purposes of convenience, will be illustrated as a cyclotetrasiloxane in which all the R' groups are vinyl, and one mole of a modifier compound within the scope of Formula 4. Such a modifier compound is exemplified by diphenyldiallylsilane having the formula:

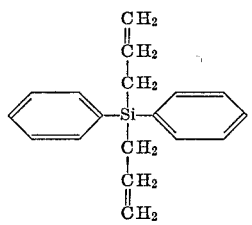

This results in a compound having the following structure:

(12) 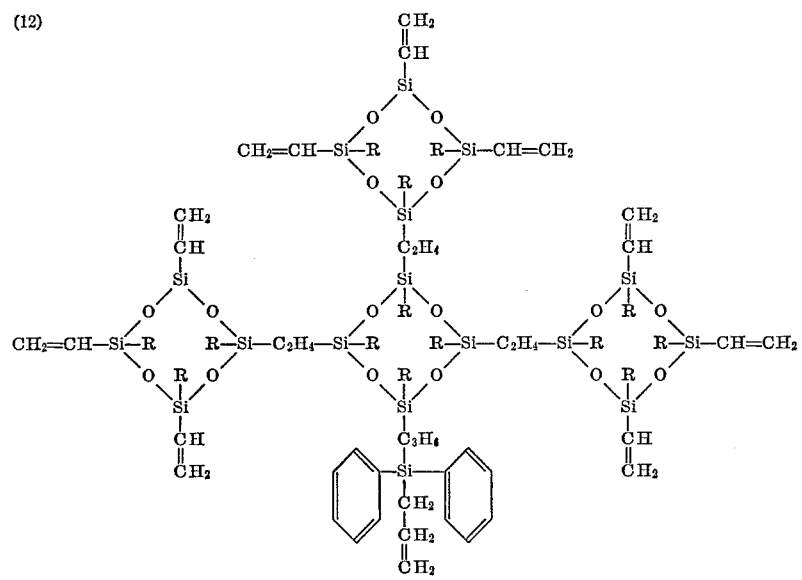

In the structure shown above, the central cyclotetrasiloxane ring is derived from the cyclotetrasiloxane of Formula 1 while the three attached cyclotetrasiloxane rings are derived from the cyclotetrasiloxane of Formula 2 and the diphenylallylpropylene radical is derived from the diphenyldiallylsilane. The polymer is built up further by the reaction of, for example, one molecule of cyclotetrasiloxane of Formula 1 reacting with both the right hand silicon-bonded vinyl group of the upper cyclotetrasiloxane ring shown in Formula 12 and the upper silicon-bonded vinyl group of the right hand cyclotetrasiloxane ring shown in Formula 12. In this fashion, the polymer molecule grows with each cyclotetrasiloxane ring being connected to three or four other cyclotetrasiloxane rings through a silicon-alkylene-silicon linkage or a silicon-alkylene-silicon-alkylene-silicon linkage until an optically clear, high molecular weight, non-brittle polymeric material is obtained. As an illustration of the structure of this polymer during an intermediate stage of its growth, reference is made to the following formula:

(13)

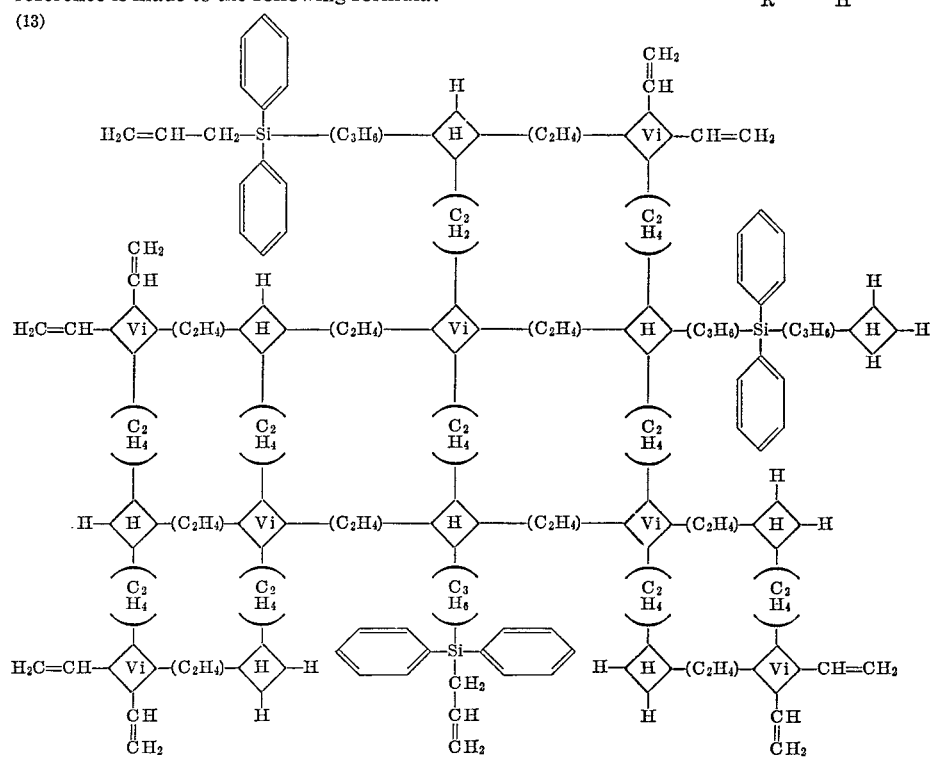

in which each of the squares represents a cyclotetrasiloxane ring with each point of the square representing a silicon atom. For simplicity, oxygen atoms, R groups, and tetramer silicon atoms have been omitted from this diagrammatic formula. The Vi within a square indicates that the unit is a residue of a methylvinylcyclotetrasiloxane molecule and the H within a square indicates that the unit is a residue of a methyl hydrogen cyclotetrasiloxane molecule. The prepolymer as shown by Formula 13 will continue to polymerize in the fashion outlined.

While Formula 13 shows the polymer of the present invention as a planar material, it is apparent that each of the cyclotetrasiloxane rings, prior to incorporation into the polymer structure, can rotate freely so that instead of actually being a planar material, the molecules which comprise the polymers of the present invention are three dimensional.

From the structure of the polymers of the present invention as shown in Formula 13, it is apparent that those cyclotetrasiloxane rings which are at the end of the molecule can contain unreacted silicon-bonded groups containing olefinic unsaturation, silicon-bonded hydrogen atoms and radicals derived from partially reacted modifier compounds.

Because the molecule must be of a finite molecular weight, only substantially all of the silicon atoms of the cyclotetrasiloxanes are joined through a divalent alkylene radical or a modifier radical.

From the foregoing description of the specific polymer of Formula 13, it can be seen that a typical example of a polymer of the present invention is characterized by the formula:

(14)

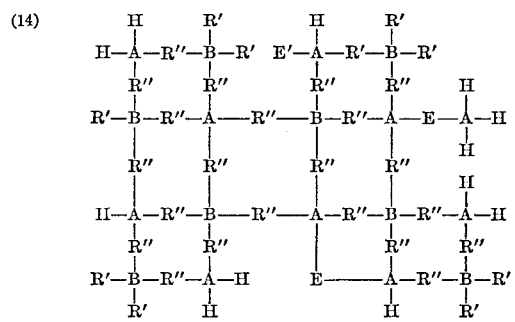

where R'' is a divalent hydrocarbon radical which is derived from the addition of the SiH linkage of the hydrogen cyclotetrasiloxane of Formula 1 to the R' radical of the olefinic cyclotetrasiloxane of Formula 2. A represents the cyclotetrasiloxane nucleus derived from the hydrogen cyclotetrasiloxane and B represents the cyclotetrasiloxane nucleus derived from the olefinic cyclotetrasiloxane, both of which are represented by the formula:

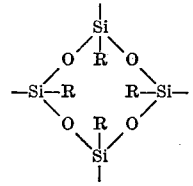

The modifier radicals shown as E in Formula 14 have been described earlier by Formulas 9 through 11, inclusive. The partially reacted modifier compound, E', is formed by the reaction of one silanic hydrogen or one vinyl group of a modifier compound within the scope of Formulas 3 through 8 with a reactive group of a cyclotetrasiloxane and R and R' are as previously defined.

The quantity of modifier radicals (E) present in the polymer is in no way limited to the amount shown in Formula 14. All of the B units may be replaced with E units or as few as 25 mole percent of the B units may be replaced with E units without sacrificing the superiority of properties found in the cyclotetrasiloxane polymers of the present invention. It can be seen that the modified tetramer polymers of the present invention are organopolysiloxanes which comprise a plurality of 8-membered rings of alternate silicon atoms and oxygen atoms with each of the silicon atoms being connected to one monovalent hydrocarbon radical free of aliphatic unsaturation. Substantially every silicon atom of each of the 8-membered rings is connected to another silicon atom of the 8-membered rings through a modifier radical as defined in Formulas 9 through 11 or a divalent alkylene radical. The term divalent alkylene radical includes a radical having the formula:

Any valences of silicon not accounted for above are satisfied by a member selected from the class consisting of hydrogen, monovalent hydrocarbon radicals containing olefinic unsaturation and partially reacted divalent modifier radicals.

Any catalyst which is operative to catalyze the addition of silicon-hydrogen bonds across olefinic double bonds can be employed as a catalyst for preparing the polymeric materials of the present invention. Among the many useful catalysts for this addition reaction are finely divided platinum as described in Patent 2,970,150, Bailey, chloroplatinic acid as described in U.S. Patent 2,823,218, Speier et al., the reaction product of chloroplatinic acid with either an alcohol, an ether or an aldehyde as described in U.S. Patent 3,220,972, Lamoreaux, trimethyl platinum iodide, and hexamethyldiplatinum as described in U.S. Patent 3,313,773, Lamoreaux and the platinum olefin complex catalysts as described in U.S. Patent 3,159,601 and 3,159,662 of Ashby. The platinum catalyzed addition reaction can become quite violent in the cyclotetrasiloxane polymerization system and it is advisable to test each batch of catalyst in a cyclotetrasiloxane polymerization system using small quantities of reactants before any large scale polymerization is attempted.

The preferred catalyst system and reaction procedure involves first reacting a methylvinylcyclotetrasiloxane with a methyl hydrogen cyclotetrasiloxane and a modifier within the scope of Formulas 3 through 8 in the presence of a trimethyl platinum iodide catalyst using heat until a workable prepolymer is formed. The preferred viscosity of the prepolymer is in the 50 to 200 centistokes range with 125 centistokes being optimum. A prepolymer having a viscosity in the 125 centistokes range is a fluid which is easily converted to the solid polymer state. The trimethyl platinum iodide catalyst is preferred in making the prepolymer because it is not as active a catalyst as many of the other catalysts mentioned. In the absence of heat, a prepolymer having a viscosity in the 125 centistokes range and containing a small quantity of trimethyl platinum iodide catalyst is a storable fluid.

When it is desired to complete the polymerization, a small quantity of a chloroplatinic acid-octyl alcohol reaction product is added and the polymerization is completed.

The amount of each catalyst employed is a function of the particular catalyst employed and the temperature at which the methyl hydrogen cyclotetrasiloxane tetramer is reacted with the methylvinyltetrasiloxane. When platinum is employed as the catalyst, the catalyst is generally present in an amount equal to from $10^{-3}$ to $10^{-7}$ moles of catalyst per mole of the cyclotetrasiloxane. When chloroplatinic acid is employed, the catalyst is generally used in an amount equal to from $10^{-4}$ to $10^{-6}$ moles of platinum per mole of cyclotetrasiloxane. When the catalyst of my aforementioned Patent 3,220,972 is used, it is employed in sufficient amount to provide from about $10^{-4}$ to $10^{-7}$ moles of platinum per mole of cyclotetrasiloxane. When trimethyl platinum iodide is employed, the catalyst is generally used in an amount equal to from $10^{-4}$ to $10^{-6}$ moles of platinum per mole of cyclotetrasiloxane.

In the foregoing discussion, the ratios given were the ratios of catalyst to the total number of moles of methylvinylcyclotetrasiloxane and methyl hydrogen cyclotetrasiloxane present. Generally, the reaction is effected at a temperature of about 30° to 120° C. However, with active catalysts, such as chloroplatinic acid or the catalyst of my aforementioned Patent 3,220,972, the reaction may be effected at room temperature, e.g., a temperature of about 20 to 25° C. In effecting the reaction, it is preferable to employ equivalent amounts of olefinic materials and silanic hydrogen-containing materials, since the polymeric materials of the present invention are composed of the reactants in this ratio. However, where it is desired that the polymeric materials be terminated substantially completely with either silanic hydrogen or with olefinic substituents, the reactant containing the desired reactive groups is employed in excess, such as up to about a 10% molar excess. This type of reaction may be employed to prepare a prepolymer containing all cyclotetrasiloxane units which may then be reacted with the corresponding olefinic or silanic hydrogen-containing modifier compound to yield the modified cyclotetrasiloxane polymer.

The time required for completion of the reaction is, of course, a function of the amount and activity of the catalyst employed, a function of the particular cyclotetrasiloxanes employed, a function of the particular modifiers employed, a function of the various fillers employed, a function of the temperature of the reaction, and a function of whether or not the prepolymer stage was employed. In general, the reaction can be accomplished in times which vary from about 30 minutes at a temperature of about 150° C. to 24 hours or more when a room temperature reaction is employed.

In addition to the cyclotetrasiloxane radicals and modifier radicals, the compositions of the present invention can contain various fillers, such as carbon black, zinc oxide, clay, whiting, slate flour, finely divided silica, such as fumed silica, silica aerogel, precipitated silica, etc. The presence of these fillers interferes with the optical clarity of the products, but increases their toughness.

When it is desired to retain optical clarity, finely ground transparent cyclotetrasiloxane polymer or modified cyclotetrasiloxane polymer having an index of refraction approaching as nearly as possible the index of refraction of the modified cyclotetrasiloxane polymer may be employed as the filler. This does not necessarily add strength to the polymer but does aid in preventing disruptive overheating during the final polymerization, and decreases the amount of internal stress in the finished polymer.

In order to evaluate the modified cyclotetrasiloxane polymers of the present invention, a standard cyclotetrasiloxane polymer was prepared according to the following example and the physical properties of the standard cyclotetrasiloxane polymer relating to its flexural strength and elasticity were determined.

In the preparation of the standard cyclotetrasiloxane polymer, two catalysts were used successively. The first catalyst was a mild catalyst, trimethyl platinum iodide. This catalyst was used because the reaction between methylvinylcyclotetrasiloxane and methyl hydrogen cyclotetrasiloxane has a tendency to become violent and a mild catalyst has a moderating influence. Also, it is convenient to first form the prepolymer, then store it until needed. This is possible using trimethyl platinum iodide in low concentrations. This catalyst is inactive in prepolymer solution at low concentration levels at room temperature and only becomes active when the reaction system is at an elevated temperature.

The second catalyst, a coordination compound of platinum with aldehydes and ethers, referred to hereinafter as platinum coordinate, which was used to cure the prepolymer to a resin, is the reaction product of chloroplatinic acid and octyl alcohol. The preparation of the second catalyst is disclosed in Example 1 of my U.S. Patent 3,220,972. The platinum coordinate catalyst was dissolved in 4 times its weight of toluene to produce the platinum coordinate catalyst solution used in the following examples. Chemical analysis of this solution showed it to contain 3.5 atoms of chlorine per atom of platinum and 0.007 gram platinum per gram of the mixture.

The following examples are illustrative of the practice of my invention and are not intended for purposes of limitation. The molds and tests used in Example 1 were also used in the remaining examples unless otherwise indicated.

Example 1

An equimolar mixture of 20.6 grams of methyl hydrogen cyclotetrasiloxane (1,3,5,7-tetramethylcyclotetrasiloxane) and 29.4 grams of methylvinylcyclotetrasiloxane (1,3,5,7 - tetramethyl-1,3,5,7-tetravinylcyclotetrasiloxane) was formed. To this mixture was added 0.1 ml. of a 1000 p.p.m. solution of trimethyl platinum iodide catalyst in benzene. A cyclotetrasiloxane prepolymer was formed by throughly blending the ingredients and heating the resulting mixture in a water bath at 95° C. to 100° C. for a length of time sufficient to build the viscosity to about 100 centistokes. This usually takes from 15 to 20 hours. The cyclotetrasiloxane prepolymer was then cooled.

To 20 grams of the cyclotetrasiloxane tetramer prepolymer was added with mixing 0.2 ml. of the platinum coordinate catalyst solution described above. The mixture was then equally divided between two molds. Each mold was machined out of steel to give a cast bar 4″ long, 1″ wide, and ⅛″ thick. The molds containing the catalyzed prepolymer were then placed in a 100° C. oven and given an initial cure of two hours to sufficiently gel the polymers so that they could be removed from the molds. After removal from the molds, the partially cured bars were placed back in the 100° C. oven long enough to give the polymers a total of 30 hours at that temperature. In most cases, a cure time of this length not necessary, however, this was done to insure that they would be completely cured.

The bars were cooled to room temperature and the strength of each bar was tested by placing the wide ends of the bars on elevated horizontal supports and driving a crosshead down against the center of the bar at a speed of 0.2″ per minute until the bar fractured. A graph was made of the pressure applied to the bar by the crosshead, versus the distance the crosshead traveled from the time the crosshead contacted the bar until the bar fractured.

The flexural strength (S) was calculated using the formula:

$$S = \frac{3PL}{2bd^2}$$

where P is the load at the moment of crack or break in pounds, L is the span in inches, b is the width of the sample tested in inches, and d is the thickness of the sample tested in inches.

The modulus of elasticity ($E_B$) was calculated using the formula:

$$E_B = \frac{L^3 m}{4bd^3}$$

where L, b and d are as defined above and m is the slope of the tangent to the straight line portion of the load-deflection curve in pounds per inch of deflection.

The area under the curve (A) was calculated using the formula:

$$A = \frac{Pi}{2}$$

where P is the load at the moment of crack or break in pounds and i is the deflection of sample in inches. The results of two tests showed the unmodified standard polymer to have an average flexural strength of 1700 pounds per square inch, an average modulus of elasticity of 75,000 pounds per square inch and A had an average value of 0.40 inch pounds.

Examples 2 through 13

In Examples 2 through 13, Example 1 was repeated using exactly the same procedure except that part or all of the methyl hydrogen cyclotetrasiloxane was replaced with a modifier compound. The results of Examples 2 through 13 are tabulated below along with the results of Example 1, which are included for comparison purposes. In the following formulas, Me represents a methyl radical and φ represents a phenyl radical.

The term "mole" refers to gram molecular weight of compound and is not a function of the number of reactive groups per molecule. As the cyclotetrasiloxane compounds used in the following examples are tetrafunctional and the modifier compounds are difunctional, the cyclotetrasiloxanes are replaced by modifier compounds in the ratio of two moles of modifier compound per mole of cyclotetrasiloxane compound.

| Example | Modifier Compound Used | Mole percent of Methylhydrogen-cyclotetrasiloxane Replaced by Modifier Compound | Percent of Cyclotetrasiloxane Silicon Atoms Attached to Modifier Radical | Flexural Strength in Pounds Per Square Inch | Modulus of Elasticity in Pounds Per Square Inch | A in Inch Pounds ($\frac{\text{force} \times \text{deflection}}{2}$) |
|---|---|---|---|---|---|---|
| 1 | None | 0 | 0 | 1,700 | 75,000 | 0.400 |
| 2 | HMeφSiO$_{0.5}$ | 25 | 14.3 | 1,930 | 122,000 | 0.572 |
| 3 | HMeφSiO$_{0.5}$ | 75 | 60 | 2,540 | 124,000 | 0.690 |
| 4 | HMeφSiO$_{0.5}$ | 100 | 100 | 3,360 | 109,000 | 1.400 |
| 5 | Hφ$_2$SiO$_{0.5}$ | 50 | 33.3 | 3,105 | 153,000 | 0.915 |
| 6 | Hφ$_2$SiO$_{0.5}$ | 75 | 60 | 4,265 | 226,000 | 1.093 |
| 7 | φ$_2$SiH$_2$ | 50 | 33.3 | 3,560 | 150,700 | 1.250 |
| 8 | φ$_2$SiH$_2$ | 75 | 60 | 3,855 | 191,500 | 1.337 |
| 9 | φ$_2$SiH$_2$ | 100 | 100 | 6,270 | 201,000 | 3.750 |
| 10 | 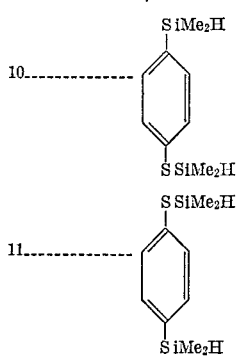 (para-bis(dimethylsilyl)benzene, SiMe$_2$H / SiMe$_2$H) | 25 | 14.3 | 2,560 | 106,000 | 0.860 |
| 11 | (same aromatic disilyl compound, SiMe$_2$H / SiMe$_2$H) | 50 | 33.3 | 4,490 | 129,000 | 2.180 |

| Example | Modifier Compound Used | Mole percent of Methylhydrogen-cyclotetrasiloxane Replaced by Modifier Compound | Percent of Cyclo-tetrasiloxane Silicon Atoms Attached to Modifier Radical | Flexural Strength in Pounds Per Square Inch | Modulus of Elasticity in Pounds Per Square Inch | A in Inch Pounds $\left(\frac{force \times deflection}{2}\right)$ |
|---|---|---|---|---|---|---|
| 12 | SiMe$_2$H–C$_6$H$_4$–SiMe$_2$H (para) | 75 | 60 | 4,910 | 138,500 | 2.720 |
| 13 | 1,2,4-tris(SiMe$_2$H)-benzene | 100 | 100 | 6,845 | 130,500 | 5.160 |

Examples 14 through 15

In Examples 14 through 15, Example 1 was repeated using exactly the same procedure except that part or all of the methylvinylcyclotetrasiloxane was replaced with a modifier compound. The results of Examples 14 through 15 are tabulated below along with the results of Example 1 which are included for comparison purposes. In the following formulas, Me represents a methyl radical, $\phi$ represents a phenyl radical, and Vi represents a vinyl radical (CH=CH$_2$).

000 pounds per square inch and the average value of A was 1.43 inch pounds.

Bars not containing filler but otherwise chemically identical and prepared in the same manner as above had a flexural strength of 3,855 pounds per square inch, a modulus of elasticity of 191,500 pounds per square inch and the average value of A was 1.34 inch pounds.

An additional bar was prepared and cured in the same manner as above except that an electronic circuit was embedded in the modified cyclotetrasiloxane polymer.

| Example | Modifier Compound Used | Mole percent of Methylhydrogen-cyclotetrasiloxane Replaced by Modifier Compound | Percent of Cyclo-tetrasiloxane Silicon Atoms Attached to Modifier Radical | Flexural Strength in Pounds Per Square Inch | Modulus of Elasticity in Pounds Per Square Inch | A in Inch Pounds $\left(\frac{force \times deflection}{2}\right)$ |
|---|---|---|---|---|---|---|
| 1 | None | 0 | 0 | 1,700 | 75,000 | 0.400 |
| 14 | Vi$_2$SiMe$_2$ | 25 | 14.3 | 2,005 | 98,200 | 0.512 |
| 15 | $\phi$–Si($\phi$)(CH$_2$CH=CH$_2$)$_2$ | 100 | 100 | 4,800 | 225,000 | 1.300 |

Example 16

A mixture in the molar ratio of 100 moles (25.3 grams) of methylvinylcyclotetrasiloxane, 25 moles (4.4 grams) of methyl hydrogen cyclotetrasiloxane, and 150 moles (20.3 grams) of diphenylsilane was formed. To this mixture was added 0.1 ml. of a 1000 p.p.m. solution of trimethyl platinum iodide catalyst in benzene (1 gram Pt per liter of solution). A modified cyclotetrasiloxane prepolymer was formed by thoroughly blending the ingredients and heating the resulting mixture in a water bath at 95° C. to 100° C. for a length of time sufficient to build the viscosity to about 100 centistokes. This usually takes from 15 to 20 hours. To the modified cyclotetrasiloxane tetramer prepolymer was added with mixing 0.2 ml. of the platinum coordinate catalyst solution described earlier and 30 grams of silica flour. The mixture was then cast into bars 4 inches long, 1 inch wide and ⅛ inch thick in the steel mold. The mold was then placed in a 100° C. oven and the bars were given an initial cure of 2 hours to sufficiently gel the polymers so that they could be removed from the mold. After removal from the mold, the partially cured bars were placed back into the 100° C. oven long enough to give the bars a total of 30 hours at that temperature. The bars were then removed from the oven and tested as in Example 1. The results were an average flexural strength of 7,590 pounds per square inch, an average modulus of elasticity of 564,-

The heating up and cooling down of the electronic components caused by operation of the circuit did not cause crazing of the modified cyclotetrasiloxane polymer.

Example 17

A mixture having a molar ratio of 100 moles (27.9 grams of methylvinylcyclotetrasiloxane, 75 moles (14.6 grams) of methyl hydrogen cyclotetrasiloxane and 50 moles (7.4 grams) of diphenylsilane was formed. To this mixture was added 0.1 ml. of a 1000 p.p.m. solution of trimethyl platinum iodide catalyst in benzene (1 gram Pt per liter of solution). A modified cyclotetrasiloxane prepolymer was formed by thoroughly blending the ingredients and heating the resulting mixture in a water bath at 95° C. to 100° C. for a length of time sufficient to build the viscosity to about 100 centistokes. This usually takes from 15 to 20 hours. The modified tetramer prepolymer was then cooled.

To the modified cyclotetrasiloxane prepolymer was added 117 grams of mixed silica filler. The mixed silica filler contained 1 part of fumed silica to 6 parts of diatomaceous earth by weight. The diatomaceous earth used was a natural occurring silica mined from the Oriskany deposit in the Appalachian Mountains. The material was a coarse, natural occurring silica with a low surface area and a pH of 6.6. To this mixture was added 0.05 ml. of the platinum coordinate catalyst solution described earlier, and the mixture was milled to assure a uniform dispersion of the catalyst.

One fraction of the filled modified cyclotetrasiloxane prepolymer was press-cured into bars in the same molds used in Example 1. The modified cyclotetrasiloxane prepolymer was cured for 15 minutes at 150° C., then post-cured at 200° C. for two hours. The properties of the bars were as follows: the density was 1.89 grams/cc., the Barco hardness was 71–76, the flexural strength varied from 2,000 pounds per square inch at 250° C. to 11,000 pounds per square inch at 0° C., the modulus of elasticity was 500,000 pounds per square inch, the ratio of the distance the bars would flex over the length of the bars was 7.25%, the bars showed infinite solvent resistance to water and mineral oils; good solvent resistance to toluene at 25° C. and acetone at 25° C.; the bars withstood 100° C. toluene for 8 hours and 110° C. trichloroethylene for 8 hours; the bars had an infinite heat life at −72° C. and infinite heat life at 150° C. showing but a slight strength decrease, at least a 2 month heat life at 200° C. and a 6 hour heat life at 250° C.; the bars withstood immersion in liquid nitrogen, could be machined, had good impact strength, the bars were removed from liquid nitrogen and placed in boiling water without cracking; the bars had good fire resistance; a dielectric constant of 3.4 and a dielectric strength of 550 volts per mil.

A second portion of the filled, catalyzed, modified cyclotetrasiloxane prepolymer was press-cured into the shape of a lower denture plate at 150° C. for 15 minutes and then post-cured at 200° C. for 2 hours.

Dentures and false teeth made from the modified cyclotetrasiloxane polymers of the present invention have advantages over the false teeth and dentures made by prior art methods with prior art materials. They are superior to polystyrene false teeth in that the abrasion resistance of the modified tetramer polymers is higher than the abrasion resistance of polystyrene and when used in denture plates they are made in one piece as opposed to the prior art method of casting a plate and attaching teeth thereto by means of gold reinforcing members.

While the foregoing examples have illustrated certain of the embodiments of the present invention, it should be understood that wide variation is possible with respect to the R groups of Formula 1 and Formula 2 and with regard to the R′ groups of Formula 2. Any variation of these R groups results in a polymer within the scope of the present invention when the cyclotetrasiloxane of Formula 1 or the cyclotetrasiloxane of Formula 2 is to the degree hereinbefore set forth replaced with a modifier within the scope of Formulas 3 through 8.

What I claim as new and desire to secure by Letters Patent of the United States is:

1. A cyclotetrasiloxane polymer comprising a plurality of 8-membered rings of alternate silicon atoms and oxygen atoms, each of said silicon atoms being connected to one monovalent hydrocarbon radical free of aliphatic unsaturation and at least 14 percent of the silicon atoms of said 8-membered rings being attached to another silicon atom of the 8-membered rings with a modifier radical selected from the class consisting of silane radicals having the formula:

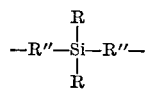

silphenylene radicals having the formula:

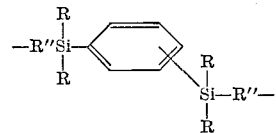

and siloxane radicals having the formula:

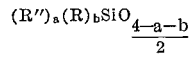

substantially every silicon atom of each of said 8-membered rings not substituted with the modifier radical being connected to a silicon atom of another of said 8-membered rings through a divalent alkylene radical, with any valences of silicon not accounted for above being satisfied by a member selected from the class consisting of hydrogen and monovalent hydrocarbon radicals containing olefinic unsaturation, where R is selected from the class consisting of alkyl radicals, aryl radicals, aralkyl radicals, cycloalkyl radicals, halogenated monovalent hydrocarbon radicals and cyanoalkyl radicals, R″ is a divalent alkylene radical bonded by a covalent bond to a silicon atom of one of said 8-membered rings, $a$ has a value of 0.5 to 1, $b$ has a value of 2, and the sum of $a$ plus $b$ has a value of 2.5 to 3.

2. The composition as defined in claim 1 wherein R is phenyl.

3. The composition as defined in claim 1 wherein the modifier radical is a radical of the formula:

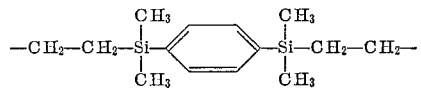

4. The composition as defined in claim 1 wherein the modifier radical is a dialkylene-substituted silane radical and R is phenyl.

5. The composition as defined by claim 1 wherein the modifier radical is a dialkylene-substituted disiloxane radical and R is phenyl.

6. The composition as defined by claim 1 wherein the modifier radical is a disiloxane radical and two R groups of the disiloxane are methyl and two R groups are phenyl.

7. The composition as defined by claim 1 which has a viscosity of 50 to 200 centistokes.

8. The composition as defined by claim 1 which is in a solid benzene insoluble, incompletely cured stage.

9. The composition as defined by claim 1 which is an optically clear, solid, resinous, thermally stable, solvent resistant completely cured organopolysiloxane.

10. A composition comprising the organopolysiloxane as defined in claim 1 in combination with a filler.

References Cited

UNITED STATES PATENTS 3,197,432   7/1965   Lamoreaux _____ 260—46.5
3,197,433   7/1965   Lamoreaux _____ 260—46.5

DONALD E. CZAJA, *Primary Examiner.*

M. I. MARQUIS, *Assistant Examiner.*

U.S. Cl. X.R.

252—63.7; 260—37, 825; 351—160